US012323390B2

(12) United States Patent
Wen (10) Patent No.: US 12,323,390 B2
(45) Date of Patent: Jun. 3, 2025

(54) FAST GAP REDUCTION IN POLICY TREE CREATION FOR POLICY SET WITH UNEVEN DENSITY

(71) Applicant: Fortinet, Inc., Sunnyvale, CA (US)

(72) Inventor: Shushan Wen, Pleasant Hill, CA (US)

(73) Assignee: Fortinet, Inc., Sunnyvale, CA (US)

( * ) Notice: Subject to any disclaimer, the term of this patent is extended or adjusted under 35 U.S.C. 154(b) by 270 days.

(21) Appl. No.: 18/125,935

(22) Filed: Mar. 24, 2023

(65) Prior Publication Data

US 2024/0323165 A1 Sep. 26, 2024

(51) Int. Cl.
*H04L 9/40* (2022.01)

(52) U.S. Cl.
CPC ...... *H04L 63/0263* (2013.01); *H04L 63/1433* (2013.01)

(58) Field of Classification Search
None
See application file for complete search history.

(56) References Cited

U.S. PATENT DOCUMENTS

| 7,203,744 | B1* | 4/2007 | Parekh | H04L 63/0263 709/224 |
| 9,722,857 | B2* | 8/2017 | Liu | H04L 41/0895 |
| 2010/0306818 | A1* | 12/2010 | Li | G06F 16/88 726/1 |
| 2014/0282854 | A1* | 9/2014 | Clark | H04L 63/20 726/1 |
| 2023/0104304 | A1* | 4/2023 | Dixit | G06F 9/30029 718/100 |
| 2023/0164118 | A1* | 5/2023 | Whelton | H04L 63/0236 726/11 |

* cited by examiner

*Primary Examiner* — Philip J Chea
*Assistant Examiner* — James Ross Hollister
(74) *Attorney, Agent, or Firm* — Law Office of Dorian Cartwright; Dorian Cartwright (57) ABSTRACT

A policy tree of nodes and leaves is automatically created from a network security policy set, by identifying density zones of policy subsets. Responsive to identifying an uneven density zone in a node of the policy tree, child nodes are generated with normal density zones from the uneven density zones. A policy bitmap is generated from a set of network security policies. A partition number is configured during bitmap labeling for the policy bitmap. A configurable threshold during bitmap labeling is adjustable according to network security policies. Further, a plurality of boundaries between low-density zones and high-density zones utilizing bitmap labeling on the policy bitmap by counting lead zeros and tail zeros.

6 Claims, 9 Drawing Sheets

FAST GAP REDUCTION IN POLICY TREE CREATION FOR POLICY SET WITH UNEVEN DENSITY

FIELD OF THE INVENTION

The invention relates generally to computer networks, for optimizing policy tree creation by reducing gaps in network security policy sets with uneven density.

BACKGROUND

In network security configuration is usually described by a set of policies, each has a matching criterion. In an industrial grade gateway, it is not uncommon to have tens of thousands of policies. Between neighboring policies, the distance on a given field, such as source IP address, destination IP address, protocol, source port, and/or destination port, can be as narrow as 0 (i.e., overlap), or as wide as near the valid range of this field (i.e., two policies sitting on the different ends of the spectrum). When a packet arrives from the network, the gateway needs to find a matched policy and process the packet based on the policy's action description, which can be a packet drop, simple forwarding to next logical port, or more sophisticated operations such as network address translation (NAT) or tunneling.

To find the matched policy for the incoming packet, a tree search is a generic solution. In order to reduce the tree depth while maintaining the search efficiency, a parent node in the tree can be cut into many child nodes, and the number of child nodes is called the partition number (PNR) of the patent node. The upper limit of PNR is usually determined by hardware, e.g., 16, 32, or 64. The higher the limit, the more costly the hardware will be. On the other hand, when the tree is being built by a special software, which converts the policy set to an image that carries the tree search instructions, a higher PNR does not necessarily generate the best tree, measured by the image size as well as search efficiency.

Usually, if the policies in the policy set have a narrow range on a field, and they are also spread out more evenly on this field, a higher PNR tends to work well. On the other hand, if the policies have a wide range on a field and heavily overlap with each other, a better PNR may not be the upper limit value, as a large PNR may cause policy replication in child nodes.

When the policies have certain overlap on a field, but are spread out in a way that there is a boundary on the field which can roughly split the policies in half, a combination of even cuts with a dynamically configured PNR on each node, and uneven binary cuts on other nodes can bring a better performance during tree search.

If the policies are concentrated in a narrow area on a field with very wide range (e.g., IPv6 source IP address or destination IP address), without an appropriate method, it would be hard to build a small but efficient tree, by simply splitting policies into half, or splitting them into PNR child nodes using even cuts.

What is needed is a robust technique for optimizing policy tree creation by reducing gaps in network security policy sets with uneven density.

SUMMARY

To meet the above-described needs, methods, computer program products, and systems for optimizing policy tree creation by reducing gaps in network security policy sets with uneven density.

In one embodiment, a policy tree of nodes and leaves is automatically created from a network security policy set, by identifying density zones of policy subsets. Responsive to identifying an uneven density zone in a node of the policy tree, child nodes are generated with normal density zones from the uneven density zones. In one embodiment, a policy bitmap is generated from a set of network security policies. A configurable partition number is applied during bitmap labeling for the policy bitmap. A configurable threshold during bitmap labeling is adjustable according to network security policies. Further, a plurality of boundaries between low-density zones and high-density zones utilizing bitmap labeling on the policy bitmap by counting lead zeros and tail zeros. The node can be binary split with a single condition check, into two partitions, on an identified boundary of the plurality of boundaries between a low-density zone and a high-density zone of the policy bitmap.

In another embodiment, responsive to identifying a normal density zone in the policy set, the node of an identified boundary is cut between normal density zones into a number of partitions based on a partition number, into child nodes. The policy tree of nodes and leaves comprising normal density zones are stored in the network device and subsequently serve requests at the network device to search the policy tree for application to a network.

Advantageously, shallower overall policy trees improve the performance of firewall devices during policy searches.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for optimizing policy tree creation by reducing gaps in network security policy sets with uneven density. One of ordinary skill in the art will recognize many alternative embodiments that are not explicitly listed based on the following disclosure.

I. Systems for Reducing Gaps in Policy Sets (FIGS. 1-2)

Figure 1:
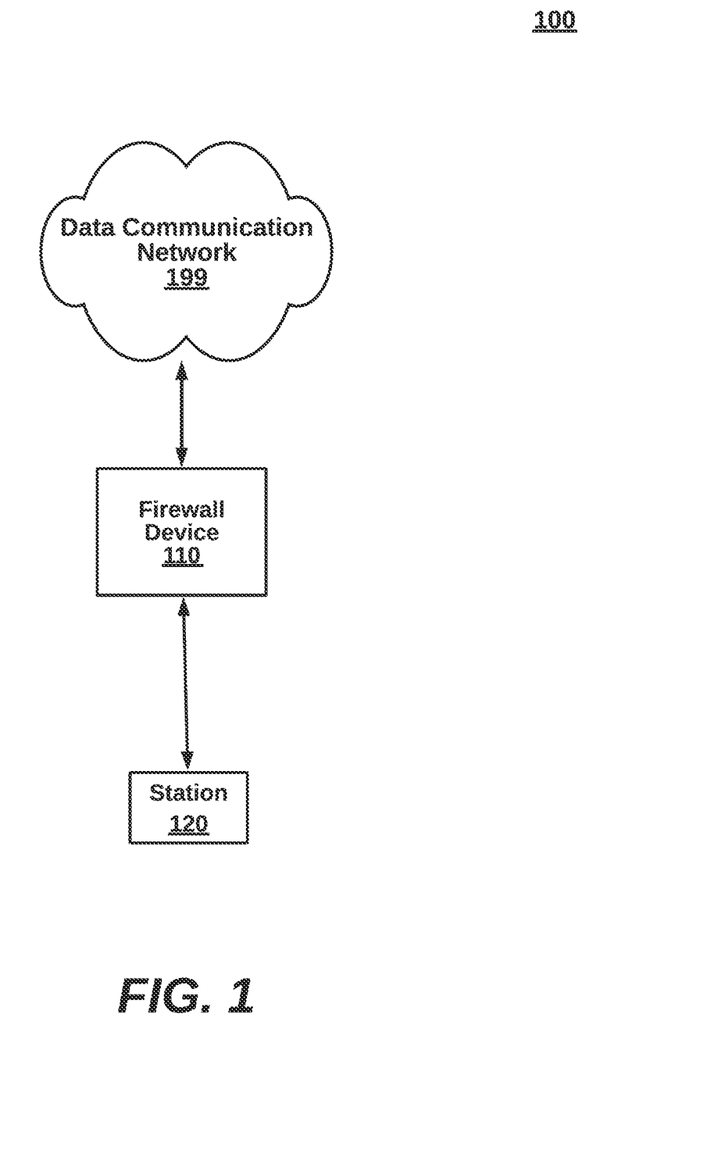
FIG. 1 is a high-level block diagram illustrating a system for optimizing policy tree creation by reducing gaps in network security policy sets with uneven density, according to one embodiment.
Figure 2:
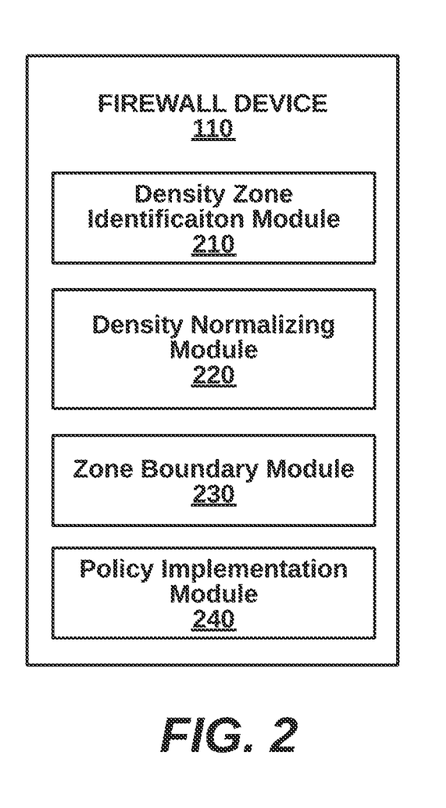
FIG. 2 is a more detailed block diagram illustrating a firewall device of the system of FIG. 1, according to one embodiment.

FIG. 1 is a high-level block diagram illustrating a system 100 for optimizing policy tree creation by reducing gaps in network security policy sets with uneven density, according to one embodiment. The system 100 includes a firewall device 110 coupled to a data communication network 199 and a station 120. Other embodiments of the system 100 can include additional components that are not shown in FIG. 1, such as controllers, network gateways, access points, and additional wired or wireless stations.

In one embodiment, the components of the automatic system 100 are coupled in communication over a private network connected to a public network, such as the Internet. In another embodiment, system 100 is an isolated, private network. The components can be connected to the data communication system via hard wire (e.g., firewall device 110). The components can also be connected via wireless networking (e.g., station 120). The data communication network can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or IPv6 address spaces.

Figure 5A:
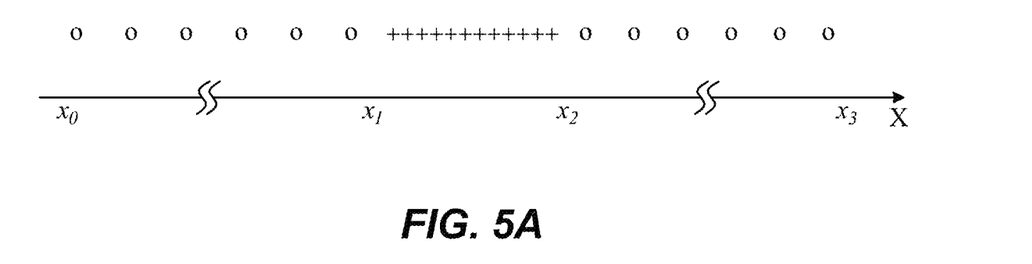
FIG. 5A is a schematic diagram illustrating a policy set identified with uneven density, according to an embodiment.

The firewall device 110 creates optimized policy trees and examines data packets destined to and sourced from the station 110. A policy set with uneven density has the policies in the policy set distributed unevenly on a given field, which includes, but is not limited to, source IP address, destination IP address, protocol, source port, and/or destination port. FIG. 5A illustrates the distribution of a policy set on a field X, where each "o" represents a sparse policy that has a farther distance from its neighboring policies, while each "+" represents a dense policy that is much closer to its neighboring policies. As a common practice for a policy search tree to work efficiently, there is a policy count limit at the leaf nodes; in other words, if a node in the policy search tree carries more policies, it will be further cut into more child nodes, each carrying only a subset of the policies.

The policy set shown in FIG. 5A introduces a challenge of maintaining a shallow tree, especially when field X has a very wide valid range, such as IPv6. In FIG. 5A, the distance between x0 and x1 (and the distance between x2 and x3) can be much longer than the distance between x1 and x2. Therefore, even by using PNR of 32 to make a cut, it can take 20 or more layers to reach a node that carries only the dense policies between x2 and x3. If some sparse policies have range overlap with each other, the tree can get deeper as a smaller PNR at each node is likely chosen to prevent policy replication.

The firewall device 110 is described further below with respect to FIG. 2.

The station 120 exchanges data packets that are subject to network policies of the firewall device 110. In one embodiment, a network administrator uses the station 120 to log in to the firewall device 110 for configuration.

FIG. 2 is a more detailed block diagram illustrating the firewall device 110 of the system of FIG. 1, according to one embodiment. The firewall device 110 includes a density zone identification module 210, a density normalizing module 220, a zone boundary module 230, and a policy implementation module 240. The components can be implemented in hardware, software, or a combination of both.

The density zone identification module 210 can automatically create a policy tree of nodes and leaves from a network security policy set, by identifying density zones of policy subsets.

The density normalizing module 220, responsive to identifying an uneven density zone in a node of the policy tree, generates child nodes with normal density zones from the uneven density zones. In one embodiment, a policy bitmap is generated from a set of network security policies. A configurable partition number during bitmap labeling for the policy bitmap. A configurable threshold during bitmap labeling is adjustable according to network security policies. Further, a plurality of boundaries between low-density zones and high-density zones utilizing bitmap labeling on the policy bitmap by counting lead zeros and tail zeros. The node can be binary split with a single condition check, into two partitions, on an identified boundary of the plurality of boundaries between a low-density zone and a high-density zone of the policy bitmap.

The zone boundary module 230, responsive to identifying a normal density zone in the policy set, cuts the node of an identified boundary between normal density zones into a number of partitions based on a partition number, into child nodes. The upper limit of number of partitions is not limited by hardware as is generally the case with conventional systems.

The policy implementation module 240 stores the policy tree of nodes and leaves comprising normal density zones in the network device and subsequently serves a request at the network device to search the policy tree for application to a network.

II. Methods for Reducing Gaps in Policy Sets (FIGS. 3-5)

Figure 3:
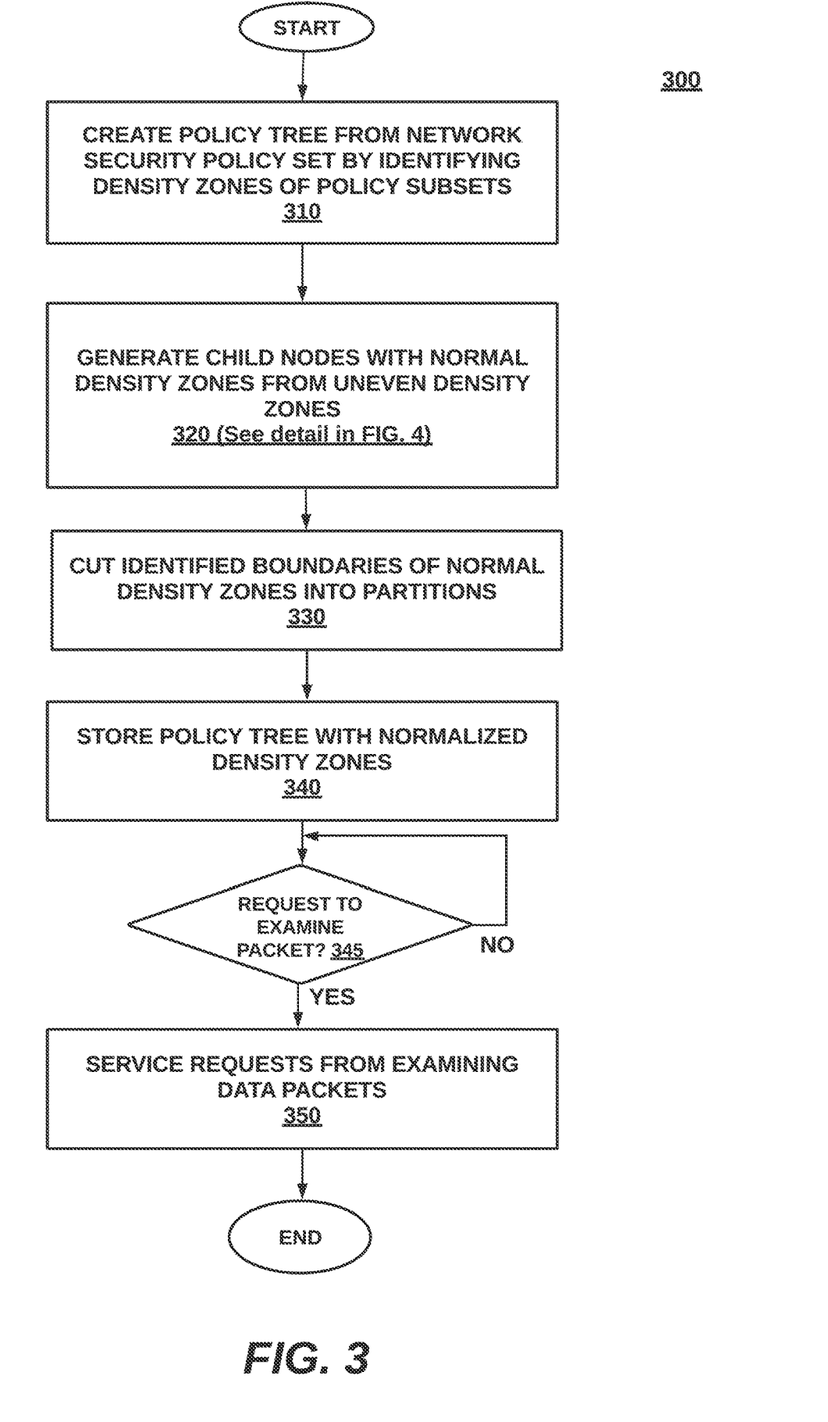
FIG. 3 is a high-level flow diagram illustrating a method for optimizing policy tree creation by reducing gaps in network security policy sets with uneven density, according to one embodiment.

FIG. 3 is a high-level flow diagram illustrating a method 300 for optimizing policy tree creation by reducing gaps in network security policy sets with uneven density, according to one embodiment. The method 300 can be implemented by, for example, system 100 of FIG. 1.

At step 310, a policy tree of nodes and leaves is created from a network security policy set, by identifying density zones of policy subsets.

Figure 4:
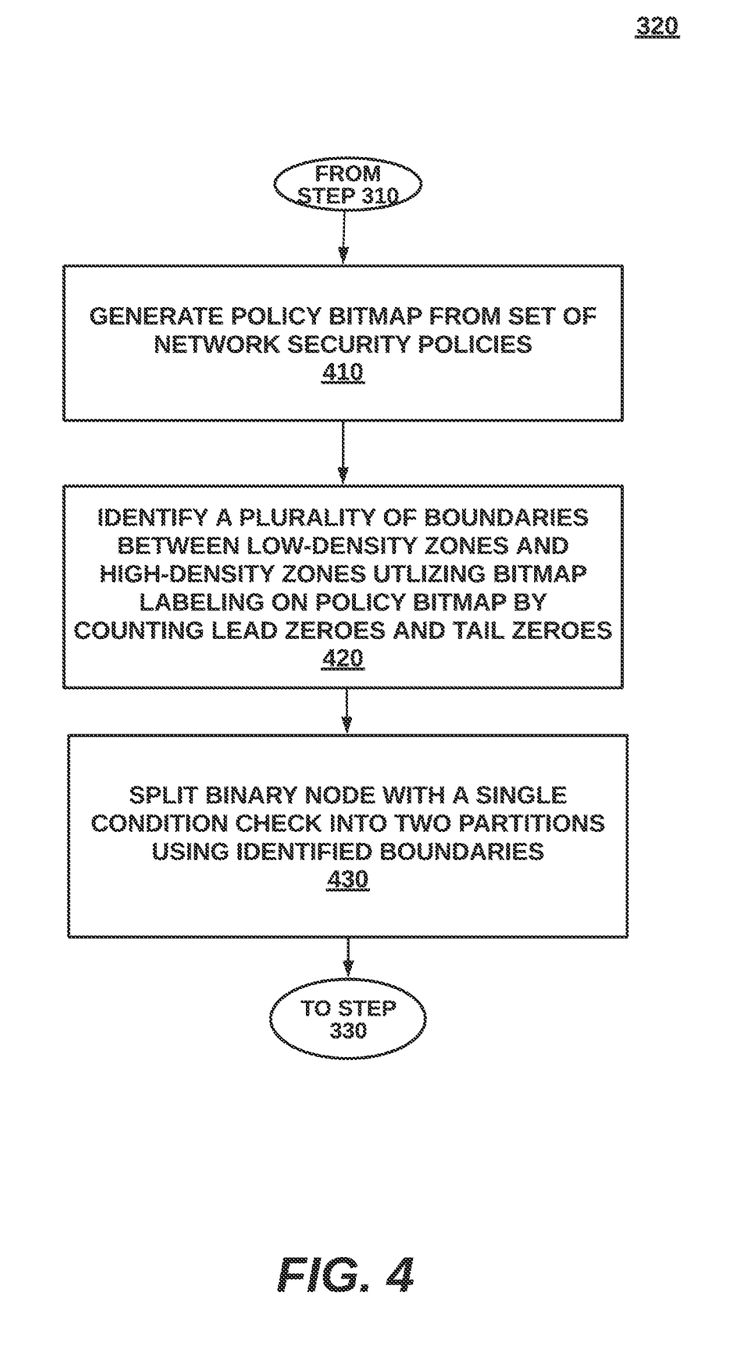
FIG. 4 is a more detailed flow diagram illustrating a step for generating child nodes with normal density zones from uneven density zones, from the method of FIG. 3, according to an embodiment.

At step 320, responsive to identifying an uneven density zone in a node of the policy tree, child nodes with normal density zones are generated from the uneven density zones, as detailed further in FIG. 4.

At step 330, responsive to identifying a normal density zone in the policy set, the node of an identified boundary is cut between normal density zones into a number of partitions based on a partition number, into child nodes.

At step 340, the policy tree of nodes and leaves comprising normal density zones in the network device is stored.

At step 350, requests at the network device are served by searching the policy tree for application to a network packet, responsive to a request to examiner a packet, at step 345.

Turning to FIG. 4, at step 410, a policy bitmap is generated from a set of network security policies. A configurable partition number can be used during bitmap labeling for the policy bitmap. A configurable threshold can be adjusted during bitmap labeling according to network security policies.

At step 420, a plurality of boundaries is identified between low-density zones and high-density zones utilizing bitmap labeling on the policy bitmap by counting lead zeros and tail zeros.

At step 430, the node is binary split with a single condition check, into two partitions, on an identified boundary of the plurality of boundaries between a low-density zone and a high-density zone of the policy bitmap.

Figure 5B:
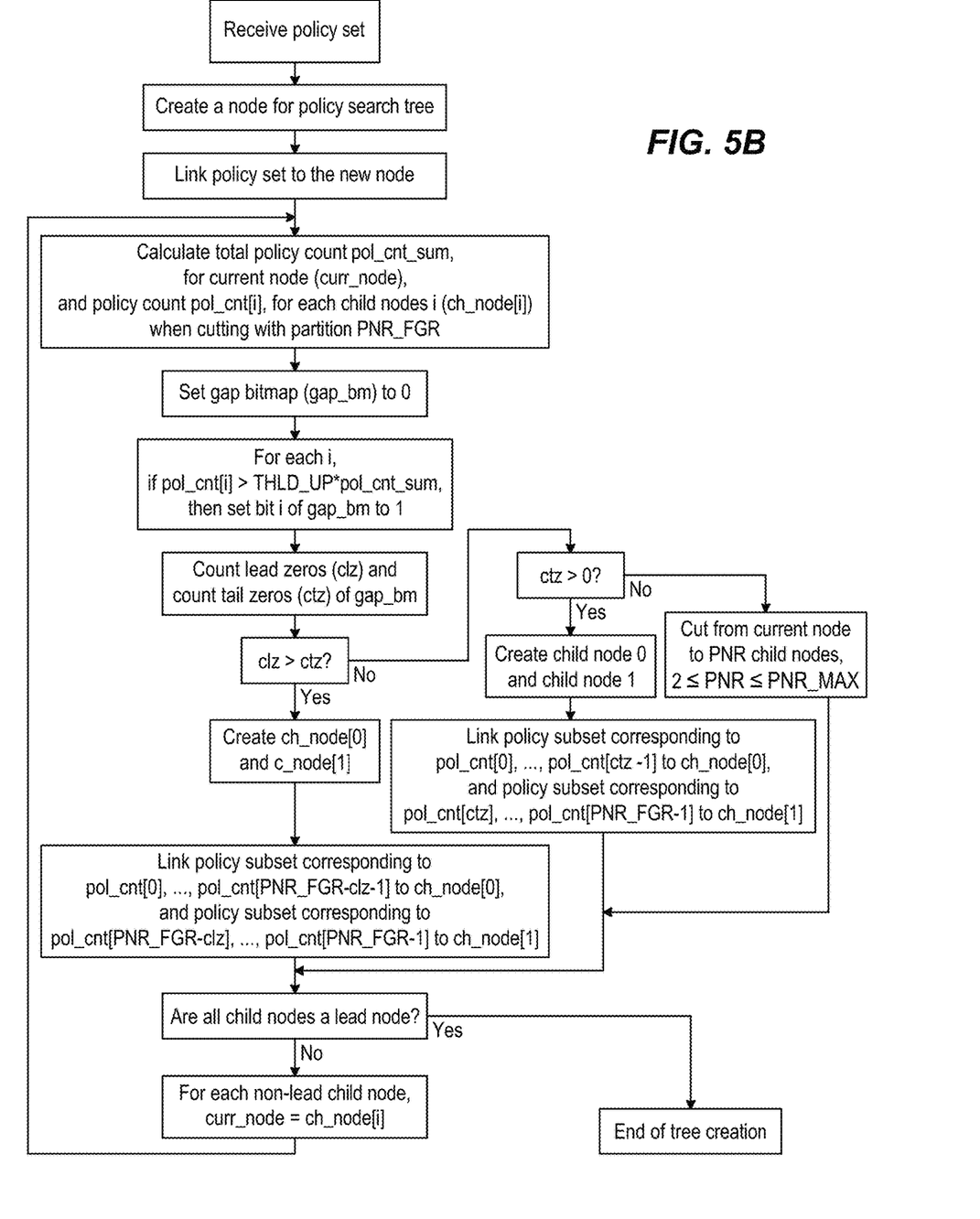
FIG. 5B is a flow chart illustrating a different embodiment for optimizing policy tree creation with gap reduction, according to an embodiment.

According to an embodiment, the flowchart of the FGR method is given by FIG. 5B. After receiving a policy set (from the user or network administrator), a node (root) is created for the policy search tree, to which the given policy set is also linked.

Afterwards, the total policy count (pol_cnt_sum) of the policy set for this node is calculated, as well as the policy count for each child node (ch_node[i], i=0, 1, . . . , PNR_FGR-1), pol_cnt[i], assuming the current node (curr_node) is cut with partition PNR_FGR (which may be equivalent to PNR_MAX, but may also be much larger, for reasons given below). At this point, no child nodes exist, and pol_cnt[i] is what we are focused on from the "trial cut".

To detect the boundary between the sparse policy zones and the dense policy zones, a gap bitmap (gap_bm) is initialized to 0. For each pol_cnt[i] compared with a ratio of the total policy count, i.e., THLD_UP*pol_cnt_sum, if pol_cnt[i] is greater, bit i at gap_bm is labeled as 1. For example, in the uneven density policy distribution shown in FIG. 5A, if the range from x1 to x2 falls into child nodes 8 and 9, then gap_bm is 0x300 in hex decimal format, or 0000_0000_0000_0000_0000_0011_0000_0000 in binary format.

Figure 5C:
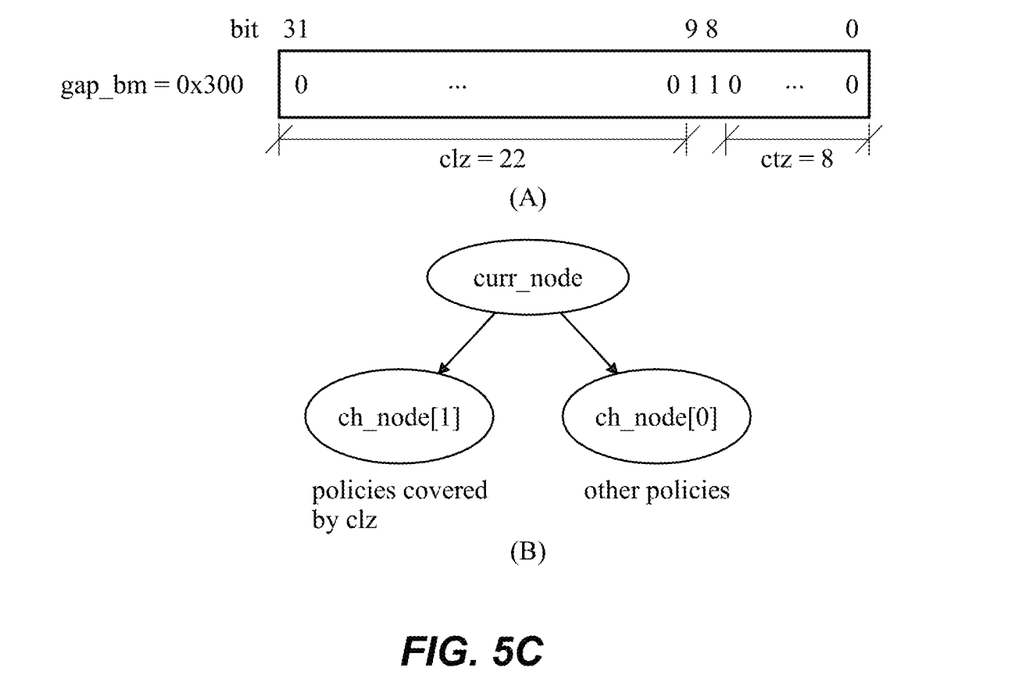
FIG. 5C is a schematic diagram illustrating gap relationships and node splitting, according to an embodiment.

Based on the gap_bm value, count lead zeros (clz) and count tail zeros (ctz) are obtained. As illustrated in FIG. 5C, clz=22 and ctz=8. Since clz is greater than ctz, the current node is cut into ch_node[1] that is linked to policies covered by clz, and ch_node[0] for policies with a range covered by the rest of area. In other words, the previous child nodes 0 to 9 when gap_bm is calculated are materialized by ch_node[0], and the previous child nodes 10 to 31 are materialized by ch_node[1].

If clz is not greater than ctz and if ctz is greater than 0, the current node is cut into child_node[0] that is linked to policies covered by ctz and child_node[1] is linked to policies with a range covered by the rest area. The comparison between clz and ctz serves the purpose of splitting the wider sparse policy zone from the dense policy zone with a single condition check during policy search.

As shown in FIG. 5C, based on the clz and ctz values, the current node is split into two child nodes. Since ch_node[0] includes the dense policy zone as well as the sparse policy zone represented by ctz, the same gap reduction method can be applied to it recursively, until no gap is found, or all child nodes are a leaf node, which is usually determined by a combination of conditions such as when pol_cnt_sum is less than a configurable value, and/or the maximum range count of all policies is smaller than a configurable value. If no gap is found, but not all child nodes are a leaf node due to aforementioned conditions, the current node is cut into PNR child nodes, where PNR is selected for a balance between splitting policies (with a higher PNR) and restricting policy replication (with a lower PNR). The process will continue recursively on every child node until it becomes a leaf node.

According to an embodiment, as PNR_FGR in the FGR method is only used to set the resolution of gap_bm, it is not restricted by the hardware. Therefore, a larger PNR_FGR can be chosen, and it differs from the original PNR_MAX which is the hardware limit. For example, for the FGR that runs on an IPv6 field, we can set PNR_FGR to 1024, and clz and ctz will potentially be a larger value, but the logic flow is similar to the one given by FIG. 5B. By using PNR_FGR of 1024, the FGR method can reduce the gaps in one layer of tree cut that can be done with at least two layers when PNR_FGR is 32. When PNR_FGR changes, THLD_UP will need an adjustment accordingly.

The value of THLD_UP reflects the threshold that each partition in the "trial cut" has more policies to be considered dense. According to one embodiment, for example, if 5 times of the average density is used to divide the zones, THLD_UP can be set to 5/PNR_FGR, which is about 0.5% when PNR_FGR is 1024.

Figure 5D:
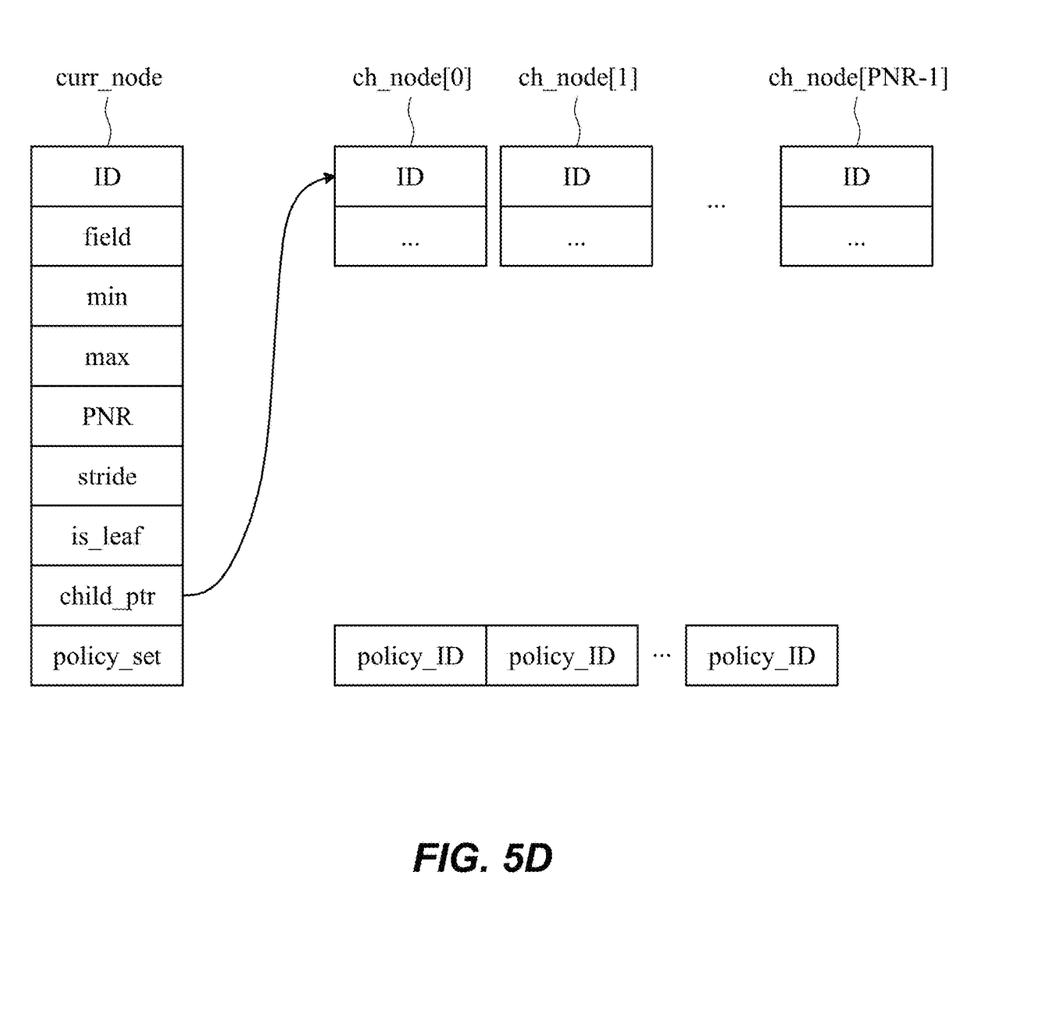
FIG. 5D is a schematic diagram illustrating a node structure, according to an embodiment.

According to one embodiment, illustrated in FIG. 5D, the node structure has the following components, ID, field, min, max, PNR, stride, is_leaf, child_ptr, and policy_ptr. The ID represents a unique node ID, which can be assigned incrementally when the tree is built. The field tells the exact field that this node is focused on, such as protocol. The min and the max are the minimum value and maximum value of all policies in the policy set for this node, on the given field, respectively. The PNR is partition number, and also the number of child nodes. The stride tells how wide the field each child node gets from the current node; in other words, ch_node[0] gets (min, min+stride-1), ch_node[1] gets (min+stride, min+2*stride-1), and so on. The boolean flag is_leaf indicates the current node is a leaf node (True) or not (False). When is_leaf is False, there will be child nodes pointed by the child_ptr; otherwise, the child_ptr is Null. The policy_ptr points to the policy set for the current node.

In order to reuse the policy information for all nodes to achieve better memory efficiency, the policy set pointed by the policy_ptr of a node can be simply an array of policy IDs, each further can be located from the policy database which contains the full information of the policy.

If the FGR is triggered, PNR is set to 2, ch_node[0] gets (min, min+stride-1), and ch_node[1] gets (min+stride, max).

In certain cases, if gap_bm has only a few bits with value 0, i.e., clz and ctz have very small values, the current node may not need to be split based on policy densities, and the regular cuts with a selected PNR on each node are applied to the entire policy set linked to it. To maintain this feature, a new threshold, THLD_CZ (threshold of counting zeros) are introduced. The logic block "clz>ctz" in FIG. 2 is replaced by "(clz>ctz) and (clz>THLD_CZ)". Similarly, "ctz>0" is replaced by "ctz>THLD_CZ".

In FIG. 5B, the FGR splits the policy set into two zones, which is easy to support in hardware, as a single boundary check between the two zones determines which child node is the next step during policy search. On the other hand, if policy sets have both large clz and ctz very often, a hardware-enhanced three zone cut can be beneficial.

Figure 5E:
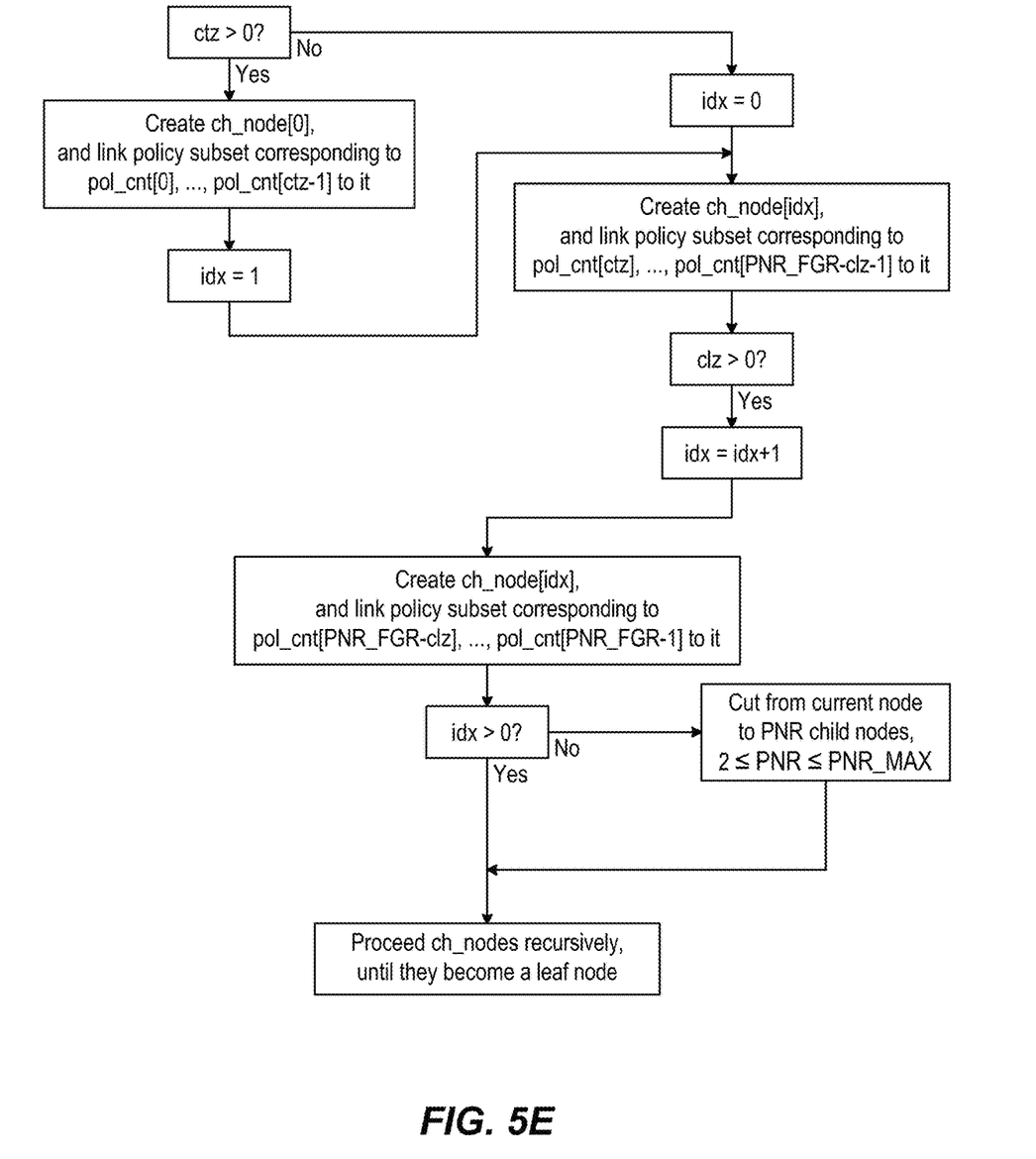
FIG. 5E is a flow diagram illustrating a method for using three zone cuts in policy tree optimization, according to an embodiment.

According to an alternative embodiment, the FGR with three zone cut has a flowchart represented by FIG. 5E, which will create three child nodes if both clz and ctz are greater than 0; or two child nodes if either clz or ctz are greater than 0, but not both. When both clz and ctz are 0, the FGR is not triggered, and a selected PNR is used to split the current node. The process continues on child nodes until they become a leaf node.

According to one embodiment, when three zones exist, the node structure shown in FIG. 5D uses one more component, stride2, to indicate the width of the second zone. In other words, ch_node[0] has (min, min+stride-1), ch_node[1] has (min+stride, min+stride+stride2-1), and ch_node[2] has (min+stride+stride2, max).

III. Computing Device for Reducing Gaps in Policy Sets (FIG. 6)

Figure 6:
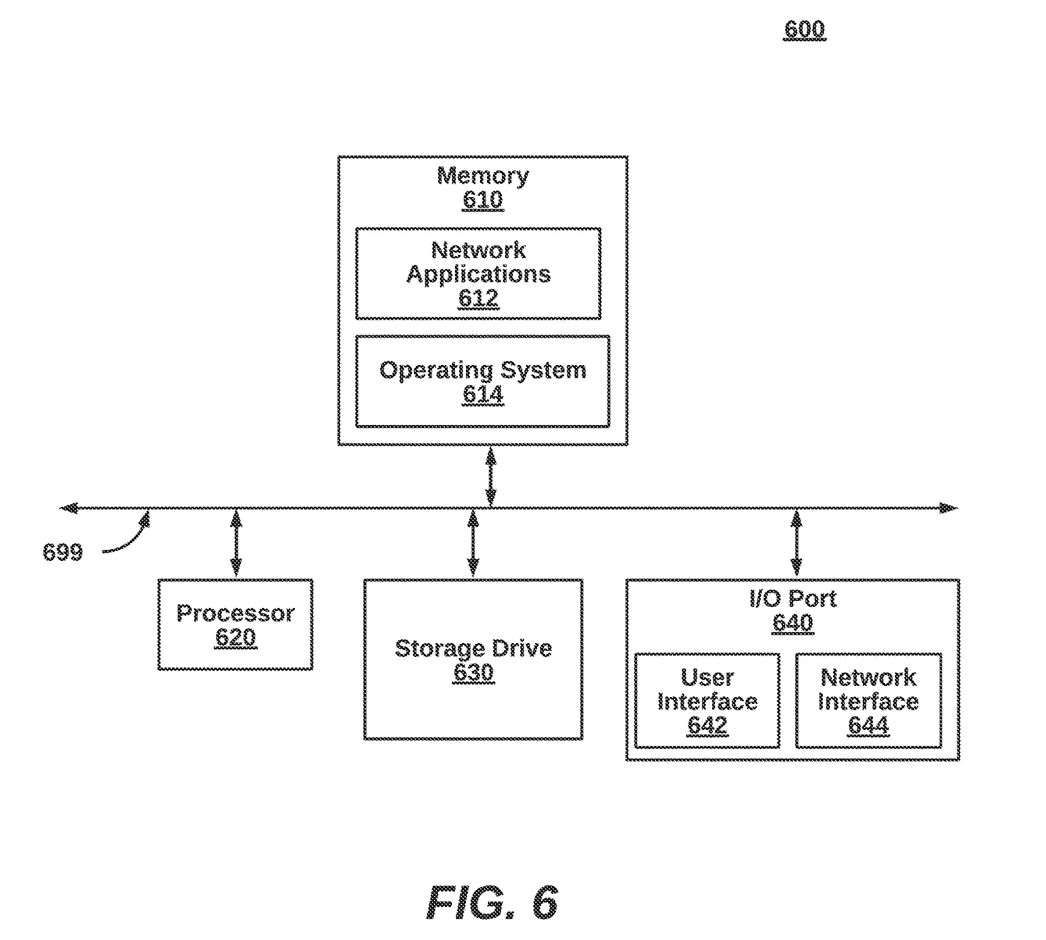
FIG. 6 is a block diagram illustrating an example computing device for the system of FIG. 1, according to one embodiment.

FIG. 6 is a block diagram illustrating a computing device 600 for use in the system 100 of FIG. 1, according to one embodiment. The computing device 600 is a non-limiting example device for implementing each of the components of the system 100, including the firewall device 110 and the station 120. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 699. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, OR Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in a network device examining data packets on a data communication network, for optimizing policy tree creation by reducing gaps in network security policy sets with uneven density, the method comprising:
   automatically creating a policy tree of nodes and leaves from a network security policy set, by identifying density zones of policy subsets;
   responsive to identifying an uneven density zone in a node of the policy tree, generating child nodes with normal density zones from the uneven density zones, comprising:
      generating a policy bitmap from a set of network security policies, wherein a partition number is used during bitmap labeling for the policy bitmap is configurable, and wherein a configurable threshold during bitmap labeling is adjustable according to network security policies;
      identifying a plurality of boundaries between low-density zones and high-density zones utilizing bitmap labeling on the policy bitmap by counting lead zeros and tail zeros;
         binary splitting the node with a single condition check, into two partitions, on an identified boundary of the plurality of boundaries between a low-density zone and a high-density zone of the policy bitmap;
   responsive to identifying a normal density zone in the policy set, cutting the node of an identified boundary between normal density zones into a number of partitions based on the partition number, into child nodes;
   storing the policy tree of nodes and leaves comprising normal density zones in the network device; and
   subsequently serving a request at the network device to search the policy tree for application to a network packet.

2. The method of claim 1, further comprising:
   recursively identifying density zones until no further uneven density zones are identified.

3. The method of claim 1, further comprising:
   using a threshold to control the width of low-density zones.

4. The method of claim 1, wherein the configurable partition number is not limited by hardware.

5. A non-transitory computer-readable medium in a network device examining data packets on a data communication network, for optimizing policy tree creation by reducing gaps in network security policy sets with uneven density, the method comprising:
   automatically creating a policy tree of nodes and leaves from a network security policy set, by identifying density zones of policy subsets;
   responsive to identifying an uneven density zone in a node of the policy tree, generating child nodes with normal density zones from the uneven density zones, comprising:
      generating a policy bitmap from a set of network security policies, wherein a partition number during bitmap labeling for the policy bitmap is configurable, and wherein the configurable threshold during bitmap labeling is adjustable according to network security policies;
      identifying a plurality of boundaries between low-density zones and high-density zones utilizing bitmap labeling on the policy bitmap by counting lead zeros and tail zeros;
         binary splitting the node with a single condition check, into two partitions, on an identified boundary of the plurality of boundaries between a low-density zone and a high-density zone of the policy bitmap;
   responsive to identifying a normal density zone in the policy set, cutting the node of an identified boundary between normal density zones into a number of partitions based on a partition number, into child nodes;
   storing the policy tree of nodes and leaves comprising normal density zones in the network device; and
   subsequently serving a request at the network device to search the policy tree for application to a network packet.

6. A network device examining data packets on a data communication network, for optimizing policy tree creation by reducing gaps in network security policy sets with uneven density, the network device comprising:
   a processor;
   a network interface communicatively coupled to the processor and to the WLAN; and
   a memory, communicatively coupled to the processor and storing:
      a density zone identification module to automatically create a policy tree of nodes and leaves from a network security policy set, by identifying density zones of policy subsets;
      a density normalizing module to, responsive to identifying an uneven density zone in a node of the policy tree, generate child nodes with normal density zones from the uneven density zones, comprising:
         generating a policy bitmap from a set of network security policies, wherein a partition number during bitmap labeling for the policy bitmap is configurable, and wherein the configurable threshold during bitmap labeling is adjustable according to network security policies;
         identifying a plurality of boundaries between low-density zones and high-density zones utilizing bitmap labeling on the policy bitmap by counting lead zeros and tail zeros;
            binary splitting the node with a single condition check, into two partitions, on an identified boundary of the plurality of boundaries between a low-density zone and a high-density zone of the policy bitmap;
      a zone boundary module to, responsive to identifying a normal density zone in the policy set, cut the node of an identified boundary between normal density zones into a number of partitions based on a partition number, into child nodes; and
      a policy implementation module to store the policy tree of nodes and leaves comprising normal density zones in the network device and subsequently serve a request at the network device to search the policy tree for application to a network packet.

\* \* \* \* \*